Aug. 30, 1949.   W. C. DE GRAFF   2,480,715
MACHINE TOOL
Filed Jan. 21, 1948   2 Sheets-Sheet 2
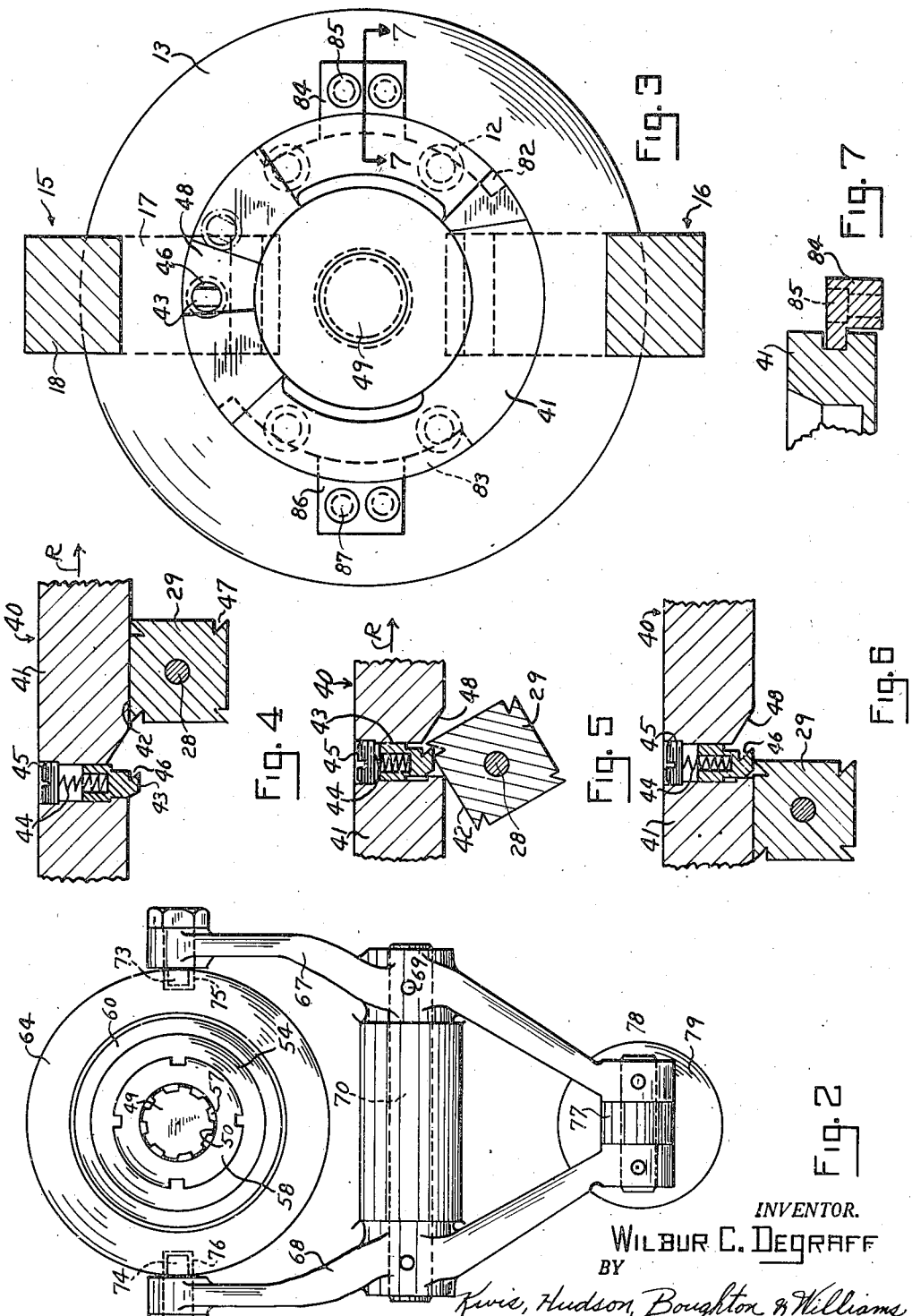
INVENTOR.
WILBUR C. DEGRAFF
BY
Kwis, Hudson, Boughton & Williams
ATTORNEYS Patented Aug. 30, 1949

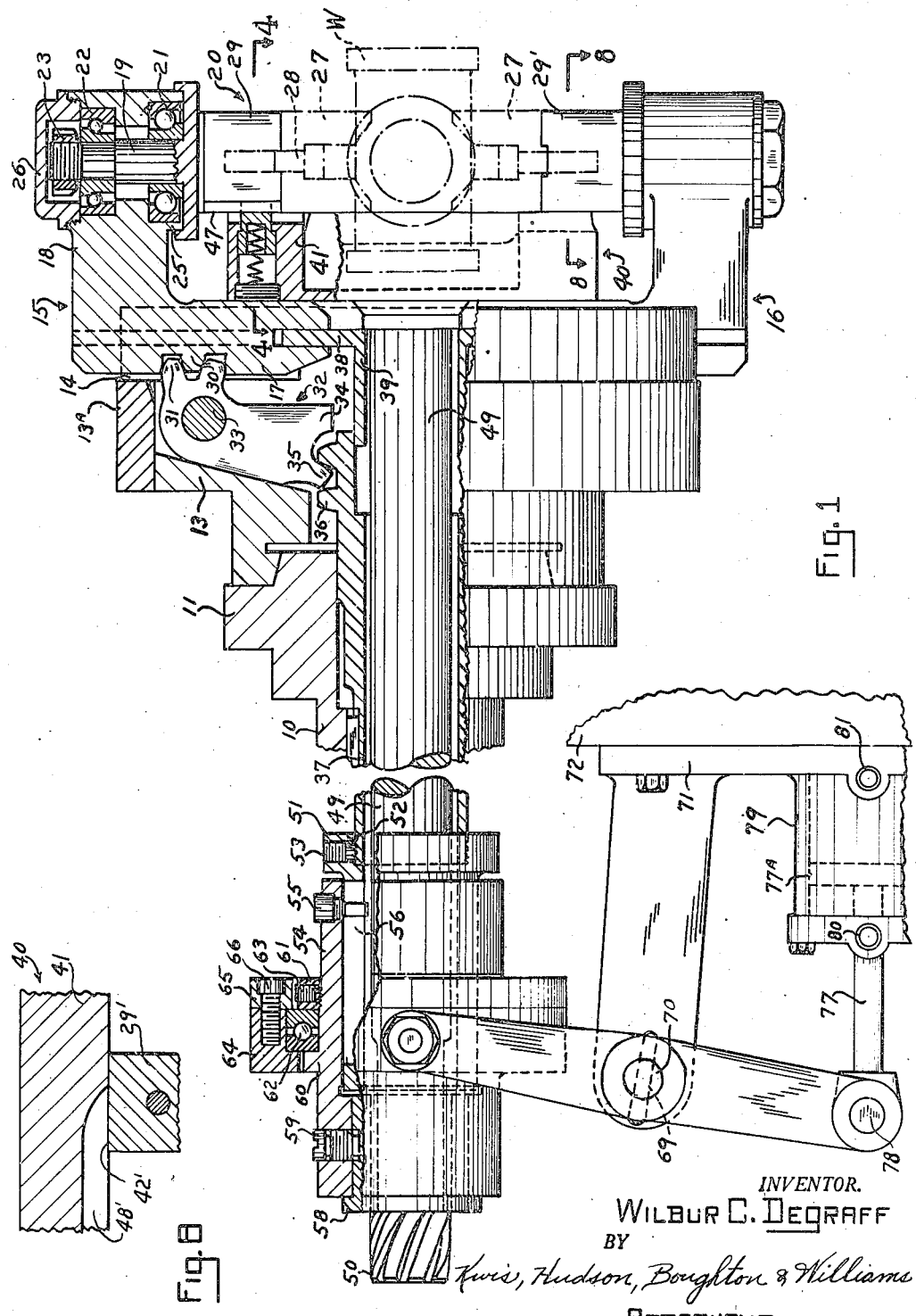

2,480,715

UNITED STATES PATENT OFFICE 2,480,715

MACHINE TOOL

Wilbur C. De Graff, Chagrin Falls, Ohio, assignor to The Warner & Swasey Company, Cleveland, Ohio, a corporation of Ohio Application January 21, 1948, Serial No. 3,640

11 Claims. (Cl. 279—5)

This invention relates to a machine tool and more particularly to an improved indexing chuck for a machine tool.

In the manufacture of pipe fittings of the T- and L-types, or of other types, as well as a number of other articles, machining operations must be performed upon more than one side or face of the article. If a high level of productivity of such articles is to be achieved, it is necessary that the article holding means be readily indexed in a manner such that each side or face of the article is successively, accurately positioned in operative relationship with the tool or tools which are to operate thereon without the necessity of removing the article from the holding means for each such repositioning. In order to secure this desired positioning, machine tool chucks have been devised in the past in which the jaws may be rotatively indexed without releasing the article held thereby. However, many of the prior art indexing chucks have been so constructed that indexing of the jaws, and hence of the article held thereby, can be effected only when the chuck is at rest so that the machine must be stopped for each repositioning of the article. This prevents the machine tool from being used in its most efficient manner and increases the cost of machining the article. While some chucks have been devised heretofore which are capable of indexing an article while the chuck is rotating, these chucks are either quite complicated, and hence expensive, or are not entirely satisfactory for a variety of other reasons.

An object of this invention is to provide an improved work holding means for a machine tool, which work holding means is relatively inexpensive to construct and simple to operate; and is adapted to rotatably index the workpiece while the work holding means and the workpiece are being rotated.

Another object of the invention is to provide an improved chuck and chuck operating mechanism for use in a machine tool, which chuck is adapted to rotate and to have its work holding means indexed relative to the main body of the chuck while the latter is rotating, the indexing mechanism including an actuating member rotatable with the chuck and relative thereto and having a projection for engaging and moving a polygonally shaped portion of one of said work holding means when the said member is rotated relative to the main body of the chuck, whereby the work holding means and the work held thereby may be indexed while being rotated.

A further object of the invention is to provide an improved indexing chuck mechanism of the type mentioned in the preceding object and in which a portion of said actuating member cooperates with the face of the polygonal portion of the work holding means to lock the latter, and the work held thereby, in an indexed position until the mechanism is again operated for indexing the work holding means and the work to a new position.

The invention further resides in certain novel features of construction and combination and arrangements of parts, and further objects and advantages thereof will be apparent to those skilled in the art to which it pertains from the following description of the present preferred embodiment thereof, described with reference to the accompanying drawings in which similar reference characters represent corresponding parts in the several views and in which:

Fig. 1 is a fragmentary side view of a chuck and its operating mechanism constructed in accordance with this invention with parts broken away and others shown in section to more clearly illustrate the construction;

Fig. 2 is an end view of the chuck indexing mechanism illustrated in Fig. 1, the view being taken from the left side in Fig. 1;

Fig. 3 is a front view of the chuck illustrated in Fig. 1, the jaws being broken away to more clearly show the actuating member for indexing the rotatable portions of the jaws;

Fig. 4 is a fragmentary sectional view, taken substantially on the section indicating line 4—4 of Fig. 1, showing the actuating member and polygonally shaped portion of one of the jaws prior to an indexing operation;

Fig. 5 is a view similar to Fig. 4 but showing the parts at an intermediate stage in an indexing operation;

Fig. 6 is a view similar to Figs. 4 and 5 but showing the parts in the positions which they occupy just after an indexing operation has been completed, and in which the jaw is locked against rotation;

Fig. 7 is a fragmentary sectional view taken substantially on the section indicating line 7—7 of Fig. 3; and Fig. 8 is a fragmentary sectional view, taken substantially on the section indicating line 8—8 of Fig. 1, showing the actuating member and the polygonally shaped portion of the other of the jaws after an indexing operation has been completed.

In Fig. 1 of the drawings there is illustrated a portion of a work spindle 10 for a machine tool, the spindle being provided with the usual chuck attaching nose 11. Mounted on the spindle nose 11, by means of bolts 12 or the like, is the main body member 13 of the improved work holding means or chuck of this invention. This body member 13 may be formed either in one piece or of several united parts, the latter construction being that which is illustrated in Fig. 1 wherein it will be seen that a removable cylindrical cover portion 13a is provided to afford a ready means of access to recesses or openings in the chuck body.

The body member of the chuck is provided with a pair of diametrically extending recesses or openings 14 in the forward face thereof forming guideways in which a pair of oppositely disposed jaw holding members 15 and 16 are slidingly mounted. Each jaw holding member comprises a radially extending portion 17, which portion is received in one of guideways 14, and an axially extending portion 18 which extends forwardly from the body member 13. Adjacent their forward ends each of the axially extending portions 18 is provided with a radially extending bore in which a stepped cylindrical portion 19 of a work engaging means 20 is rotatably supported by antifriction thrust bearings 21 and 22. The steps on the cylindrical portions 19 of each of the work engaging means provide shoulders for cooperation with the inner races of the bearings 21 and 22, the outer races of these bearings being retained in counterbored portions of the bore through the corresponding jaw holding member. The outer end of each of the cylindrical portions 19 is threaded and is provided with a nut 23 and lock washer so that the work engaging means 20 are held from radial displacement relative to the portions 18 of the jaw holding members while relative rotation is permitted therebetween. A removable cap or plug 26 is provided for the outer end of the bore in each of the portions 18 to retain the bearing 21 and prevent dust or other foreign matter from entering the bearings 21 and 22.

The inner ends of the work engaging means 20 preferably are formed as replaceable members or jaws 27 to permit work of various shapes and sizes to be properly held therebetween. The jaws 27 are each secured to the corresponding member 20 by a bolt 28, proper positioning of the parts being secured, and relative rotation therebetween being prevented, by a rectangular, diametrically extending tongue on each member 27 which fits into a correspondingly shaped groove in the end of the corresponding member 20. Each of the work engaging members 20 has the portion thereof, adjacent the jaw 27, formed polygonally, as viewed in cross section, for a purpose hereinafter described, these two polygonal portions being designated 29 and 29', respectively.

In order to effect actuation of the jaw holding members 15 and 16 to and from work gripping position, their radially extending portions 17 are each provided with a tooth 30 which is received in an opening between teeth-like projections 31 on one arm of a bell-crank lever 32, which lever is pivotally mounted by a pin 33, or the like, in the main body member 13. The other arm 34 of the bell-crank lever is provided with a tooth-like projection 35 which is adapted to be received between, and actuated by, spaced circumferentially extending teeth 36 provided adjacent the inner end of a jaw actuating member 37. This jaw actuating member 37 is slidably carried in the spindle bore and is keyed, splined or otherwise operatively connected thereto to rotate therewith. The jaw actuator 37 is provided with a conventional means, not shown, by which the said actuator may be axially moved thereby rocking the bell-crank levers 32 to move the jaw holding members 15 and 16. That is to say, when the actuator is moved to the right as viewed in Fig. 1, the jaw holding members 15 and 16 of the chuck are moved outwardly to work releasing position and, when the actuator 37 is moved to the left as viewed in Fig. 1, the jaw holding members 15 and 16 move radially inwardly to firmly grip and hold a workpiece W therebetween. The jaw holding members 15 and 16 are guided in their radial movements by the guideways 14 and additionally by a cylindrical flange 38 provided upon the outer end of a sleeve 39, the flange 38 being received in slotted openings at the inner end of the radially extending portions 17 of the jaw holding members 15 and 16. This sleeve 39 is fixedly mounted in the body member 13 and held against axial movement, the inner end of the sleeve 39 extending into the forward end of the jaw actuator 37 to provide a sliding support for the latter.

The workpiece W here illustrated is a pipe coupling provided with four radially extending ports or openings disposed 90° apart with respect to each other with their axes in a common plane. It will be understood, however, that the invention is not limited to use with such a workpiece but may be employed with articles of other configurations, useful for other purposes, and the type of pipe coupling here indicated as held by the chuck is intended solely to facilitate the description. In manufacturing such a coupling, a number of machining operations must be performed upon each of the four openings or ports. These operations, for example, may comprise boring, facing and threading and during such operations, the work engaging means of the chuck and hence the workpiece, must be firmly held from rotation about an axis extending through the cylindrical portions 19 of the work engaging means. After the operations upon one face or side of the coupling are completed it must then be indexed or repositioned by rotating 90° to bring the next succeeding face or side into operative relationship with the tool or tools which are to operate thereon. These steps, of firmly holding the workpiece and work engaging means of the chuck from rotation relative to the body member of the chuck during the machining operation and then indexing the work holding means and workpiece to bring a new side or face of the latter into operative relationship to the tool or tools which are to effect the machining operations, are then repeated until each of the sides or faces of the workpiece have been suitably machined.

In order to effect this indexing and holding of the work engaging means of the chuck, and hence of the workpiece W, the chuck is provided with an actuating member, generally designated 40, which is mounted in the chuck to rotate therewith and relative thereto. In the form illustrated in the drawings, this actuating member comprises an annular portion 41 which is positioned between the work engaging members 20 and the radial portions 17 of the jaw holding members 15 and 16. The rear face of this annular portion preferably has a sliding engagement with the portions 17 of the jaw holding members, and the forward face of the annular portion of the actuating member has a planar surface or surfaces which engage one of the planar surfaces, such as 42 and 42', on the polygonally shaped portions 29 and 29', respectively, of the work engaging means for any indexed position of the latter, see Figs. 4, 6 and 8. It will be apparent therefore that, when the planar surfaces upon the annular portion 41 and the polygonally shaped member 29 are in engagement, the upper work engaging means 20, as viewed in Figs. 1 and 3, is positively held from rotation about its axis which extends diametrically with respect to the chuck, and, since this work engaging means as well as the other work engaging means firmly grip the workpiece W therebetween, the said workpiece and the other work engaging means are likewise held from rotation about the above mentioned diametrically extending axis. In addition, rotation of the work engaging means is further prevented by engagement of a portion of the planar surface 42' of the lower polygonal portion 29' with a portion of the planar surface on 41, see Fig. 8. This is the position of the parts when the workpiece has been indexed and is being operated upon by a tool or tools, it being understood that the chuck and hence the workpiece are rotated during such machining operations by the usual driving means contained in the headstock of the tool in which headstock, not shown, the spindle 10 and chuck are rotatably mounted.

As shown in Figs. 4, 5 and 6, the annular portion 41 of the actuating member 40 is provided with a projection in the form of a plunger member 43 which is slidably mounted in a bore in the annular portion 41 and is urged outwardly with respect to the forward face of the annular portion by a compression spring 44, positioned between the plunger member 43 and a plug 45, the extent of outward projection of the member 43 being limited by cooperating shoulders formed upon said member and in the annular member 41. The plunger member 43 is normally extended adjacent a corner of the polygonally shaped portion 29, on that one of the work engaging means 20, which is uppermost in Figs. 1 and 3, and is provided with a secantly extending recess or notch 46 which is triangular in cross section. Each face of the polygonally shaped portion 29 is also provided with a similarly shaped recess or notch 47 adjacent those corners which are the leading corners in clockwise rotation of the polygonal portion as viewed in Figs. 4, 5 and 6, the notches or recesses 47 extending throughout the length of the polygonal shaped portion 29 as shown in Fig. 1. Adjacent that side of the plunger member 43 which is provided with the recess or notch 46, the annular member 41 is provided with a radially extending recess 48 adapted to accommodate a corner of the polygonally shaped member 29 when the latter is rotated.

The construction just described is such that, when the annular portion 41 of the actuating member 40 is rotated relative to the body member 13 of the chuck, in a clockwise direction as viewed in Fig. 3, that is, in the direction of the arrows R, in Figs. 4 and 5, the notch 46 of plunger member 43 engages the adjacent notch 47 on the polygonally shaped portion 29. Continued rotation of the annular portion 41 relative to the body of the chuck causes the plunger member 43 to rotate or index the polygonally shaped portion 29 about its axis, the corner of the polygonally shaped portion being accommodated within the recess 48 of the annular member 41 and the member 43 being forced inwardly of the annular portion during this indexing movement, see Fig. 5 which represents an intermediate position of the parts during an indexing operation. Still further rotation of the actuating member 40 relative to the chuck causes the annular portion 41 thereof to occupy the position as shown in Fig. 6 from which it will be seen that the polygonally shaped portion 29 has rotated 90°.

In view of the fact that the jaws 27 are firmly gripping a workpiece W, the indexing of the polygonally shaped portion 29 is transmitted by the workpiece so that the lower work engaging means 20, as viewed in Figs. 1 and 3, is also indexed 90°. To permit this action the annular portion 41 of the actuator is provided with a second recess 48' in the face thereof to accommodate the corner of the polygonal portion 29', see Fig. 8. The indexing operation is terminated when a flat surface on the annular portion 41 is in engagement with substantially an entire flat surface 42 on the adjacent face of the polygonally shaped portion 29. At the same time a portion of a flat surface 42' on the polygonally shaped portion 29' will be in engagement with a portion of a flat surface on the annular portion 41. Therefore, the upper jaw 27, as viewed in Figs. 1 and 3, is held from rotation in either direction about its axis by the polygonal portion 29 and the lower jaw is held from rotation in one direction about its axis by the polygonal portion 29', this being the direction in which the thrust of a boring or threading operation upon the workpiece tends to rock the latter. Consequently the workpiece W which has been indexed by the indexing of the work engaging means 20, is also held from further rotation about the diametrical axis extending through the work engaging means since the workpiece is firmly held thereby and must move therewith.

The actuating member 40 will be left in its indexed position, as shown in Figs. 6 and 8, during the machining operations upon the indexed portion of the workpiece. When, during the next indexing movement, the actuating member 40 is returned to its position as shown in Fig. 4, the plunger member 43 simply slides over the adjacent surface of the polygonally shaped member 29, the side of the plunger diametrically opposite the notch 46 being preferably beveled to allow the plunger to be cammed inwardly by the polygonal portion 29 if the latter has moved beyond the plunger during the indexing operation. After the plunger member has cleared the polygonal portion in this return movement, the spring 44 again projects the plunger member 43 outwardly with respect to the annular portion 41 of the actuating member so as to be positioned for again engaging the polygonally shaped portion.

In order to effect the above described indexing operation, the actuating member 40 is provided with an elongated, axially extending shaft 49 which is integral with or rigidly connected to the annular portion 41. The shaft 49 extends through and beyond the previously mentioned sleeves 39 and 37, the outer end of the shaft 49 being provided with cam shaped surfaces 50 for cooperation with other cam shaped surfaces 51, about to be described, for effecting relative rotation between the actuating member 40 and the body member 13 of the chuck.

As shown in Fig. 1, the outer end of the jaw actuating sleeve 37 is provided with a sleeve extension 51 which is threaded upon the outer end of sleeve 37 and secured thereto by a deformable plug 52 and screw 53. Slidably supported upon the sleeve 51 is a second sleeve 54 which carries an inwardly projecting key screw 55, the latter being slidably received within an axially extending slot 56 in the sleeve 51 so that the sleeves 54 and 51 are interconnected for rotation together and with the spindle 10 while permitting axial movement of the sleeve 54 relative to the sleeve 51. Adjacent its outer end the sleeve 54 is provided with the previously mentioned cam shaped surfaces 57, see Fig. 2. In the illustrated embodiment the cam shaped surfaces 50 and 57 are shown as helical splines formed upon the shaft 49 and in a nut member 58, the latter being connected to the outer end of sleeve 54 by a set screw 59 or the like which engages in an opening in the nut member to prevent relative movement between the nut and sleeve members. While helical splines have been illustrated upon the shaft and nut it will be apparent that other camming configurations may be employed so long as they are effective to produce relative rotation between the shaft 49 and the sleeve 54 upon axial movement of the latter.

The sleeve 54 is further provided with an exterior flange 60 and an antifriction bearing 62 is mounted between this flange and a retaining ring 61, the latter preferably being threaded upon cooperating threads on the sleeve 54 and retained in adjusting position by a set screw 63. Surrounding the flange 60 in spaced relationship thereto is an annular member 64 having an inwardly projecting flange adjacent one side thereof for cooperation with one of the races of the bearing 62. The other side of the member 64 has an annular member 65 connected thereto by means of screws 66 or the like, the member 65 projecting inwardly adjacent the other race of the bearing 62 as shown in Fig. 1. The members 64 and 65 are axially moved but held from rotation, by means hereinafter described, the bearing 62 permitting relative rotation between the sleeve 54 and the members 64 and 65 while retaining the sleeve and members for movement together in an axial direction with respect to the shaft 49. This axial movement of the sleeve 54 produces rotation of the shaft 49, and hence of the annular portion 41, in one direction or the other depending upon the direction of the axial shifting movement thereby effecting the previous described indexing.

In order to permit the above mentioned relative rotation between the sleeve 54 and the members 64 and 65, the spaces between retaining ring 61 and shoulder 60, and between the members 64 and 65 are such that the races of the bearing 62 may rotate relative thereto without appreciable axial play. That is, when an axial force, directed to the right as viewed in Fig. 1, is applied to the member 64 this member firmly engages the adjacent race of the bearing 62 preventing relative rotation therebetween. At the same time the other race of the bearing is held from rotation relative to ring 61 by engagement thereof with said ring. The balls of the bearing, however, permit relative rotation between the races and hence between the member 64 and the sleeve 54, the races of the bearing rotating relative to the shoulder 60 and member 65, respectively. When an axial force is applied to the member 64 to the left or in a reverse direction, the member 65 engages the adjacent race of bearing 62, preventing relative rotation therebetween, and the other race of the bearing engages shoulder 60 so as to be held against relative rotation with respect thereto. The balls of the bearing again permit relative rotation between the races and hence between member 64 and sleeve 54, the races of the bearing now rotating relative to the retaining ring 61 and the member 64.

Axial movement is imparted to the member 64 by means of a pair of spaced levers 67, 68 which are connected intermediate their ends, by dowel pins 69 or the like, to either end of a shaft 70, the shaft 70 being rockingly supported in a bore extending through the outer end of a bracket member 71 which is, in turn, fixedly secured to the frame 72 of the machine tool. The upper end of each of the levers 67 and 68 is provided with a pivot pin 73 and 74, respectively, which pins are freely received in openings or recesses 75 and 76 at diametrically opposite points on the annular member 64. The lower ends of the levers 67 and 68 are connected in spaced relations on a pivot pin or shaft 78, by dowel pins, and the intermediate portion of said shaft forms a bearing for the outer end of a piston rod 77. The piston rod 77 extends to and is connected with a piston 77a located within a cylinder 79 which is carried by the bracket member 71 of the machine tool and is provided with inlet and outlet openings or ports such as 80 and 81 for the admission and exhaust of a fluid under pressure.

The construction just described is such that when fluid under pressure is admitted to the cylinder 79 through the port 81, the port 80 then serving as the exhaust port, the piston rod 77 is moved to the left to the position shown in Fig. 1, thereby rocking the levers 67 and 68 in a clockwise direction. This moves the annular member 64, and hence the sleeve 54, to the right to the position shown in Fig. 1 so that the helical splines of the nut 53, cooperating with the helical splines on the shaft 49, cause the latter and the annular portion 41 to rotate in a clockwise direction as viewed in Fig. 3, that is, in the direction indicated by the arrow R in Figs. 4 and 5. Hence, the polygonally shaped portion 29 is engaged and indexed by the plunger member 43 as previously described, the actuating member and the polygonally shaped portion 29 then occupying the positions as shown in Fig. 6. Since the workpiece is firmly held between the jaws, it and the polygonal portion 29' are also indexed, the position of the portion 29' at the end of the indexing movement being shown in Fig. 8. The portions 29, 29' and the workpiece are held from any indexing or rocking movement during a machining operation upon the workpiece due to the engagement of the spaced planar portions on the annular portion 41 with the planar faces on the polygonally shaped portions.

When fluid pressure is admitted to the cylinder 79 through the port 80, port 81 then serving as the exhaust opening, the levers 67, 68 are rocked in the reverse direction thus moving the member 64 axially to the left as viewed in Fig. 1 and thereby causing the nut 58 to effect rotation of shaft 49 in the reverse direction to its previous actuation. This returns the annular portion 41 of the actuating member to its preindexed position relative to the polygonally shaped portions 29 and 29' of the work engaging member, this position relative to the portion 29 being shown in Fig. 4.

It will be observed that this actuation of the member 40, and hence indexing of the work engaging members 20 together with the work W held therebetween, may be effected either when the spindle 10 is stationary or when the latter is in rotation since the ball bearing 62 permits relative rotation between the annular member 64, which is non-rotatable, and the sleeve 54 which rotates with the spindle. It will also be observed that the actuating member 40 rotates with the spindle 10, when the latter is in rotation, by virtue of the driving connection therebetween effected by the interconnection of the spindle with sleeve 37 which is in turn connected with sleeve 54, the latter sleeve carrying the nut 58 the helical splines of which cooperate with the splines 50 on the shaft 49 to provide a driving connection therebetween when the spindle is rotated. Actuation of the annular member 64 during rotation of the spindle simply causes the indexing movement of the actuating member 40, that is, its relative rotation with respect to the chuck body 13, to be added to or subtracted from its rotation in conjunction with the spindle and chuck.

The annular portion 41 of the actuating member 40 is preferably provided with arcuate grooves or recesses 82 and 83 which are arranged in diametrically opposite portions of the annular member and each extend around the circumference thereof for approximately 90° as shown in Fig. 3. Extending into the arcuate groove 82 is the inner end of a lug 84, also see Fig. 7, the outer end of which is attached, by screws 85 or the like, to the main body member 13 of the chuck. A similar lug 86, fastened to the chuck body 13 by screws 87, extends into the arcuate groove 83. The inner ends of the lugs 84 and 86 have a sliding fit in the groove 82 and 83, respectively, so that axial displacement of the actuating member 40 is positively prevented without interfering with the rotation thereof relative to the chuck body 13 for effecting the previously described indexing of the jaws. The lugs 84 and 86 therefore resist any end thrust imposed upon the actuating member by movement of the nut 58 with respect to the helically splined portion of shaft 49. The provision of such end thrust resisting means obviates any tendency of the actuating member 40 to cause a lateral force to be applied to the cylindrical portions 19 of the work holding means and the jaw members 15 and 16.

The operation of the improved work holding means of this invention may be briefly summarized as follows:

Let it be assumed that the machine operations upon a workpiece have been completed and a new workpiece W is to be substituted in its place and that the indexing mechanism occupies its locked position as shown in Fig. 6. The jaw actuator sleeve 37 is then moved to the right, as viewed in Fig. 1, by conventional mechanism, not shown, thereby rocking the bell-crank levers 32 in a counter-clockwise direction. Hence, the jaw holding members 15 and 16 are moved radially outward with the result that the work engaging members 20 are separated sufficiently to allow the completed workpiece to be removed and another workpiece W to be inserted. After the new workpiece has been placed between the jaws, the jaw actuator sleeve 37 is moved in the reverse direction thus causing the jaw holding members 15 and 16 to move radially inward so that the work engaging means 20 firmly grip and hold the workpiece W with a face or side thereof which is to be machined in proper alignment with the tool or tools which are to operate thereon. The spindle 10 is then rotated by the conventional driving means, not shown, causing the chuck, and hence the workpiece, to be rotated about the axis of the spindle so that the machining operation or operations may be performed upon the workpiece. At this time the actuating member 40 for the indexing mechanism has its planar surfaces on the annular portion 41 thereof in engagement with planar faces 42 and 42' of the polygonally shaped portion 29 and 29', respectively, of the work holding means 20 so that the work engaging means, and hence the work, are prevented from rotating about an axis extending diametrically of the axis of the spindle. The indexing actuating member 40 rotates with the spindle and chuck at this time so that no relative displacement between the actuating member and the chuck takes place.

After the machining operation or operations upon the outer side or face of the workpiece have been completed and it is desired to index the work to bring a new face or side thereof into operative relation of the tool or tools of the machine tool, the operator supplies fluid pressure to the cylinder 79 through the port 80 while the spindle and chuck are still in rotation. The application of fluid pressure to the cylinder causes the piston rod 77 of the latter to rock the outer ends of the arms 67, 68 to the left, as viewed in Fig. 1, thus moving the annular member 64 axially to the left so that the sleeve 54 and the nut 58, connected therewith, are likewise moved axially in that direction. It will be remembered that when the spindle 10 is in rotation the nut 58 cooperates with the helical splines 50 on the shaft 49 to drive the latter simultaneously with the spindle. When the nut 58 is moved as just mentioned it further cooperates with the splines 50 to slightly retard the rotation of shaft 49 and hence of the annular portion 41. This retarding of rotation of the actuating member causes the chuck and its jaws to be advanced relative to the actuating member in a clockwise direction, as viewed in Fig. 3. That is, the actuating member from its locked position, substantially as shown in Fig. 6, to that shown in Fig. 4. During this movement of the mechanism, which positions the parts for indexing, the plunger 43 is depressed within the annular portion 41, the plunger 43 being again projected forwardly when it has cleared the polygonally shaped portion 29. This movement has also positioned the recess 48' to the right of the polygonal portion 29', as viewed in Fig. 8.

Fluid pressure is then applied to cylinder 79 through the port 81. This causes the piston rod 77 to move outwardly of the cylinder rocking the outer ends of the arms 67, 68 to the right, as viewed in Fig. 1, thus moving the annular member 64 axially to the right so that the sleeve 54 and the nut 58 are likewise moved axially in that direction. The cooperating splines on shaft 49 and in the nut 58 therefore slightly increases the speed of rotation of shaft 49 and hence of the annular portion 41. The increased speed of rotation of the shaft 49 during this operation advances the annular portion 41, relative to the chuck and its jaws, in a clockwise direction as viewed in Fig. 3. This movement of the actuating member relative to the polygonally shaped portion 29 causes the plunger member 43 to engage the polygonally shaped portion 29 adjacent a corner thereof, causing the latter to rotate about its axis in a clockwise direction as viewed in Figs. 4 and 5, the corner of the polygonally shaped portion being accommodated by the recess 48 in the annular portion 41 of the actuating member, the corner of the polygonal portion 29' being accommodated in the recess 48', and the plunger 43 yielding inwardly as shown in Fig. 5 to permit this rotation of the polygonally shaped portions.

When the stroke of the piston rod 77, and hence of the nut 58, have been completed the work engaging members 20 will have been indexed an amount corresponding to the central angle subtended by one side of the polygonally shaped portion 29 which in the illustrated form of the device is 90°. Consequently, the work is indexed a like amount since the work engaging means 20 firmly clamp the work therebetween. The work is held in this new indexed position by the face-to-face engagement of the planar surfaces upon the annular portion 41 and the adjacent face of the polygonally shaped portion 29 as shown in Fig. 6, this holding or locking being supplemented by the engagement of a portion of a planar face on the polygonal portion 29′ with a planar surface on the annular portion 41 of the actuating member, see Fig. 8. Hence, the workpiece has been accurately indexed to bring a new face or side into position for machining without the necessity of interrupting the rotation of the spindle and chuck.

After this newly indexed side or face of the work has been machined, fluid pressure is again supplied to the cylinder 79 through the opening or port 80 thus actuating the piston rod 77 in the direction to rock the levers 67, 68 in a counter-clockwise direction. This causes the nut 58 to again move to the left as viewed in Fig. 1, thus moving the plunger member 43 back to its position as shown in Fig. 4. Application of fluid pressure to the port 81 of the cylinder and employing the port 80 as the exhaust will then operate the mechanism, as previously described, to again index the work engaging means, and hence the work, to bring a new face or side of the latter into operative position.

In the illustrated embodiment both work engaging members 20 have been shown and described as provided with polygonally shaped portions. If desired, however, the portion 29′ may be made cylindrical rather than polygonal in which event the adjacent face of the annular portion 41 of the actuating member need not be recessed or provided with a planar surface. Also, in certain installations it is not necessary that both work engaging means 20 be rotatable. Thus, the lower of these means, as viewed in Fig. 1, may be stationary, the jaw 27 of the other work engaging means being shaped to cause relative rotation between the work and the non-rotatable jaw during indexing. Furthermore, the polygonally shaped portion 29 need not be formed substantially square in cross section, as shown, but may have a greater or lesser number of sides if desired. For example, by employing a member having eight sides an article having eight surfaces disposed at equal angular distances may be indexed. Such an eight-sided polygonal member could also be employed for indexing a four-sided article or workpiece W by operating the work indexing mechanism twice for each surface that is to be machined. Polygons having a still different number of sides may be likewise employed depending upon the type of workpiece or article that is to be indexed. Moreover, while the improved chuck has been illustrated and described as preferably embodied in a machine tool of the lathe type it will be readily apparent that the invention is also useful for positioning and holding work in drill presses, grinding machines, or the like, since rotation of the improved chuck is not necessary for its operation. Various other modifications and equivalent constructions may be employed in a practical embodiment of the invention and, therefore, the invention is not to be considered as limited to the details of apparatus which are illustrated and described except as required by the spirit and scope of the appended claims.

Having thus described my invention, I claim:

1. An indexing chuck comprising a body member, a pair of work holding means supported by said body member and adapted to clamp or unclamp a workpiece therebetween, means mounting a portion of one of said work holding means for rotation about an axis extending transversely of the axis of said body member, the said rotatable portion of said one work holding means including a polygonally shaped portion having a planar surface on each face thereof, an actuating member journalled in said body member for rotation relative thereto, means for rotating said actuating member relative to said body member, and means on said actuating member engaging said polygonally shaped portion to index the rotatable portion of said one work holding means a predetermined amount when said actuating member is rotated relative to said body member, the said actuating member having a planar surface thereon for cooperation with a planar surface on a face of said polygonally shaped portion to retain the rotatable portion of said one work holding means in the indexed position to which it is moved by said actuating member.

2. An indexing chuck comprising a body member, a pair of jaw members supported on said body member for movement towards and away from each other to clamp or unclamp a workpiece therebetween and for rotation about an axis extending transversely of the axis of said body member to rotatably index a workpiece held by said jaw members, at least one of said jaw members including a polygonally shaped portion having a planar surface on each face thereof, an actuating member journalled in said body member for rotation relative thereto, means for rotating said actuating member relative to said body member, and means on said actuating member engaging said polygonally shaped portion to index the jaw members and a workpiece held therebetween a predetermined amount when said actuating member is rotated relative to said body member, the said actuating member having a planar surface thereon for cooperation with a planar surface on a face of said polygonally shaped portion to retain the jaw members and the workpiece in the indexed position to which they are moved by said actuating means.

3. An indexing chuck comprising a body member, a pair of jaw members supported on said body member for movement towards and away from each other to clamp or unclamp a workpiece therebetween and for rotation about an axis extending transversely of the axis of said body member to rotatably index a workpiece held by said jaw members, said jaw members each including a polygonally shaped portion having a planar surface on each face thereof, an actuating member journalled in said body member for rotation relative thereto, means for rotating said actuating member relative to said body member, and means on said actuating member engaging one of said polygonally shaped portions to index the jaw members and a workpiece held therebetween a predetermined amount when said actuating member is rotated relative to said body member, the said actuating member having one or more planar surfaces thereon for cooperation with a planar surface on a face of each of said polygonally shaped portions to retain the jaw members and the workpiece in the indexed position to which they are moved by said actuating means.

4. An indexing chuck comprising a rotatable body member, a pair of work holding means supported by said body member and adapted to clamp or unclamp a workpiece therebetween, means mounting a portion of one of said work holding means for rotation about an axis extending transversely of the axis of rotation of said body member, the said rotatable portion of said one work holding means including a polygonally shaped portion having a planar surface on each face thereof, an actuating member journalled in said body member for rotation therewith and relative thereto, means for rotating said actuating member relative to said body member, and means on said actuating member engaging said polygonally shaped portion to index the rotatable portion of said one work holding means a predetermined amount when said actuating member is rotated relative to said body member, the said actuating member having a planar surface thereon for cooperation with a planar surface on a face of said polygonally shaped portion to retain the rotatable portion of said one work holding means in the indexed position to which it is moved by said actuating member.

5. An indexing chuck comprising a rotatable body member, a pair of jaw members supported on said body member for movement towards and away from each other to clamp or unclamp a workpiece therebetween, the said jaw members including portions supported for rotation about an axis extending at right angles to the axis of rotation of said body member to thereby rotatably index a workpiece held by said jaws, at least one of the rotatable portions of said jaw members including a polygonally shaped portion having a planar surface on each face thereof, an actuating member journalled in said body member for rotation therewith and relative thereto, means for rotating said actuating member relative to said body member, and means on said actuating member engaging said polygonally shaped portion to index the rotatable portions of said jaw members and a workpiece held therebetween a predetermined amount when said actuating member is rotated relative to said body member, the said actuating member having a planar surface thereon for cooperation with a planar surface on a face of said polygonally shaped portion to retain the rotatable portions of the jaw members and the workpiece in the indexed position to which they are moved by said actuating member.

6. An indexing chuck comprising a rotatable body member, a pair of jaw members supported on said body member for movement towards and away from each other to clamp or unclamp a workpiece therebetween, the said jaw members each including a portion supported for rotation about an axis extending at right angles to the axis of rotation of said body member to thereby index a workpiece held by said jaw members the rotatable portion of each jaw member including a polygonally shaped portion having a planar surface on each face thereof, an actuating member journalled in said body member for rotation therewith and relative thereto, means for rotating said actuating member relative to said body member, and means on said actuating member engaging one of said polygonally shaped portions to rotatably index the jaw members and a workpiece held therebetween a predetermined amount when said actuating member is rotated relative to said body member, the said actuating member having planar surfaces thereon for cooperation respectively with a planar surface on a face of each of said polygonally shaped portions to retain the jaw members and the workpiece in the indexed position to which they are moved by said actuating means.

7. An indexing chuck comprising a rotatable body member, a pair of aligned jaw members mounted on said body member for movement towards and away from each other to clamp or unclamp a workpiece therebetween the said jaw members including portions mounted for rotation about an axis extending at right angles to the axis of rotation of said body member to rotatably index a workpiece held by said jaws, at least one of the rotatable portions of said jaw members including a polygonally shaped portion having a planar surface on each face thereof, an actuating member journalled in said body member for rotation therewith and relative thereto, means on said actuating member engaging said polygonally shaped portion to index the rotatable portions of said jaws and a workpiece held therebetween a predetermined amount when said actuating member is rotated relative to said body member, the said actuating member having a planar surface thereon for cooperation with a planar surface on a face of said polygonally shaped portion to retain the rotatable portions of the jaw members and the workpiece in the indexed position to which they are moved by said actuating member, a collar member surrounding an axial extension of said actuating member, means to constrain said collar member to rotate with said body member while permitting axial movement of the collar member relative to the body member, cooperating camming surfaces upon said axial extension and said collar member, and means to move said collar member axially of said extension thereby causing the cooperating camming surfaces to effect rotation of said actuating member relative to the body member and thus index the rotatable portions of said jaw members and the workpiece held thereby.

8. An indexing chuck comprising a rotatable body member, a pair of aligned jaw members mounted on said body member for movement towards and away from each other to clamp or unclamp a workpiece therebetween, the said jaw members including portions mounted for rotation about an axis extending at right angles to the axis of rotation of said body member to rotatably index a workpiece held by said jaws, at least one of the rotatable portions of said jaw members including a polygonally shaped portion having a planar surface on each face thereof, an actuating member journalled in said body member for rotation therewith and relative thereto, means for rotating said actuating member relative to said body member, and a projection on said actuating member adapted to engage a corner of said polygonally shaped portion when said actuating member is rotated relative to said body member thereby indexing the rotatable portions of said jaw member and a workpiece held therebetween, the said actuating member having a recess in the face thereof adjacent said projection to accommodate a corner of said polygonally shaped portion when the latter is indexed, the said actuating member also having a planar surface thereon for cooperation with a planar surface on a face of said polygonally shaped portion to retain the rotatable portions of said jaw members and the workpiece in an indexed position.

9. An indexing chuck comprising a rotatable body member, a pair of jaw members supported on said body member for movement towards and away from each other to clamp or unclamp a workpiece therebetween, the said jaw members each including a portion supported for rotation about an axis extending at right angles to the axis of rotation of said body member to thereby index a workpiece held by said jaw members, the rotatable portion of each jaw member including a polygonally shaped portion having a planar surface on each face thereof, an actuating member journalled in said body member for rotation therewith and relative thereto, means for rotating said actuating member relative to said body member, and a projection on said actuating member adapted to engage a corner of one of said polygonally shaped portions when said actuating member is rotated relative to said body member thereby rotatably indexing the rotatable portions of said jaw members and a workpiece held therebetween, the said actuating member having spaced recesses in the face thereof to accommodate the corners of said polygonally shaped portions when the latter are indexed, the said actuating member also having spaced planar surfaces thereon for engagement respectively with adjacent planar surfaces on said polygonally shaped portions to retain the rotatable portions of said jaw members and the workpiece in an indexed position.

10. An indexing chuck comprising a rotatable body member, a pair of aligned jaw members mounted on said body member for movement towards and away from each other to clamp or unclamp a workpiece therebetween, the said jaw members including portions mounted for rotation about an axis extending at right angles to the axis of rotation of said body member to rotatably index a workpiece held by said jaws, at least one of the rotatable portions of said jaw members including a polygonally shaped portion having a planar surface on each face thereof, an actuating member journalled in said body member for rotation therewith and relative thereto, means for rotating said actuating member relative to said body member, a member movably mounted in an opening in said actuating member, resilient means normally urging a portion of said movable member to project beyond the outer face of the actuating member which projecting portion is adapted to engage a corner of said polygonally shaped portion when said actuating member is rotated relative to said body member and thereby index the rotatable portions of said jaw members and the workpiece held therebetween, the said actuating member having a recess in the face thereof adjacent said projection to accommodate a corner of said polygonally shaped portion when the latter is rotated, the said actuating member also having a planar surface thereon for cooperation with a planar surface on a face of said polygonally shaped portion to retain the rotatable portions of the jaw members and the workpiece held thereby in an indexed position, the said resilient means yielding to allow said movable member to move inwardly relative to said actuating member to permit the planar surface on the polygonally shaped portion to engage the planar surface on said actuating member.

11. An indexing chuck as defined in claim 10 and in which the means for rotating said actuating member relative to said body member includes a member mounted for rotation with said body member and for axial movement with respect thereto, cooperating camming means carried by said actuating member and said axially movable member, a member mounted to reciprocate with said axially movable member but held from rotation therewith, and means mounted upon a stationary support to reciprocate said last-mentioned member and thereby index said jaws.

WILBUR C. DE GRAFF.

REFERENCES CITED

The following references are of record in the file of this patent:

UNITED STATES PATENTS

| Number | Name | Date |
| --- | --- | --- |
| 961,867 | Krug | June 21, 1910 |
| 1,801,602 | Hunziker | Apr. 21, 1931 |
| 2,349,119 | Soule | May 16, 1944 |
| 2,362,071 | Hunziker | Nov. 7, 1944 |

FOREIGN PATENTS

| Number | Country | Date |
| --- | --- | --- |
| 23,433 | Great Britain | Sept. 15, 1904 |
| 324,751 | Great Britain | Feb. 6, 1930 |